Feb. 16, 1937.    R. C. HUGHES    2,070,660
PRESSURE REGULATING VALVE
Filed March 3, 1932    2 Sheets-Sheet 2

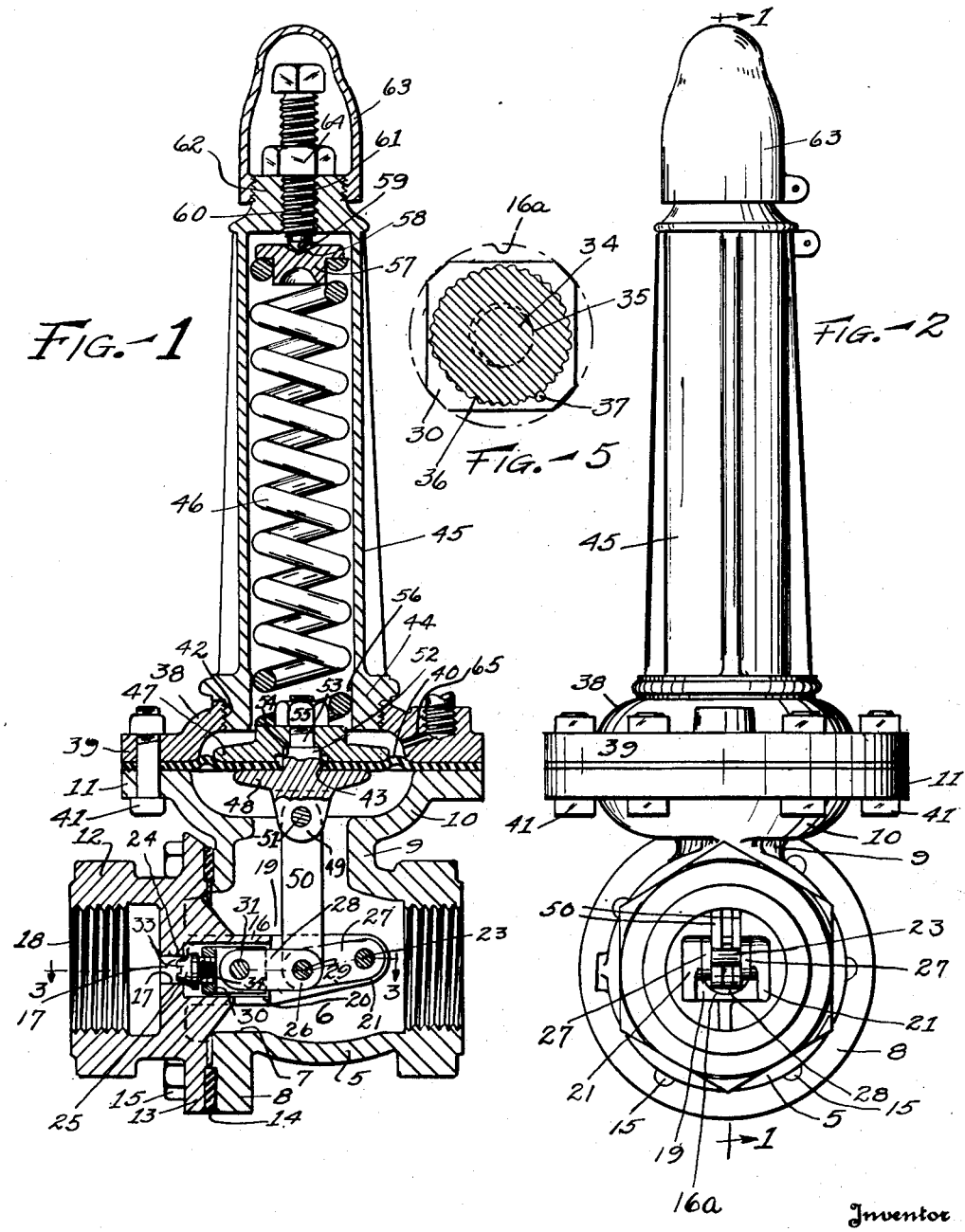

Inventor,
RALPH C. HUGHES
By Frank D. Gray
Attorney

Patented Feb. 16, 1937

2,070,660

UNITED STATES PATENT OFFICE 2,070,660

PRESSURE REGULATING VALVE

Ralph C. Hughes, Anderson, Ind., assignor to Reynolds Gas Regulator Co., Anderson, Ind., a corporation of Indiana Application March 3, 1932, Serial No. 596,487

5 Claims. (Cl. 50—26)

My invention relates to improvements in pressure-regulating valves adapted for use in connection with a relatively high pressure to reduce such pressure in gas service pipes to uniform pressure from varying pressure in the supply mains.

My invention has for its object to provide a high pressure reducing regulator comprising a toggle mechanism which is mounted bodily and as an integral part of a single inlet casting having suitable flanged connection with an inlet opening of a main casing whose inner chamber affords operating mechanism leading to a diaphragm casing mounted upon the main casing which affords highly effective automatic control of such regulating valve and especially sensitive to varying pressures in the inlet opening of the casing.

It is a further object of my invention to operate the toggle mechanism for the reducing valve by mounting both links of the toggle upon the inlet casting, and not upon the walls of the inner chamber of the main casing, so that I avoid any pressure whatever upon said casting tending to force the latter away from the main body which would tend to open the joint connecting such casting to the main body.

A further object of my invention is attained by providing a round orifice in the inlet casting axially thereof, and actuating a conical valve member against the seat of this orifice, so that adjusment of such conical member upon one of the links of the toggle mechanism will determine the pressure exerted by such member against the valve seat by a given angle between said links.

Other features of my regulator will be explained as the description of the parts is presented in detail, and as a means of illustrating my invention I have disclosed one embodiment thereof in the following drawings, in which,—

Figure 1 is a central vertical section through my regulating valve taken in the plane indicated by the line 1—1 of Fig. 2;

Figure 2 is an end elevation of the device;

Figure 5 is a transverse detail section taken in the plane indicated by the line 5—5 of Fig. 3.

Figure 3:
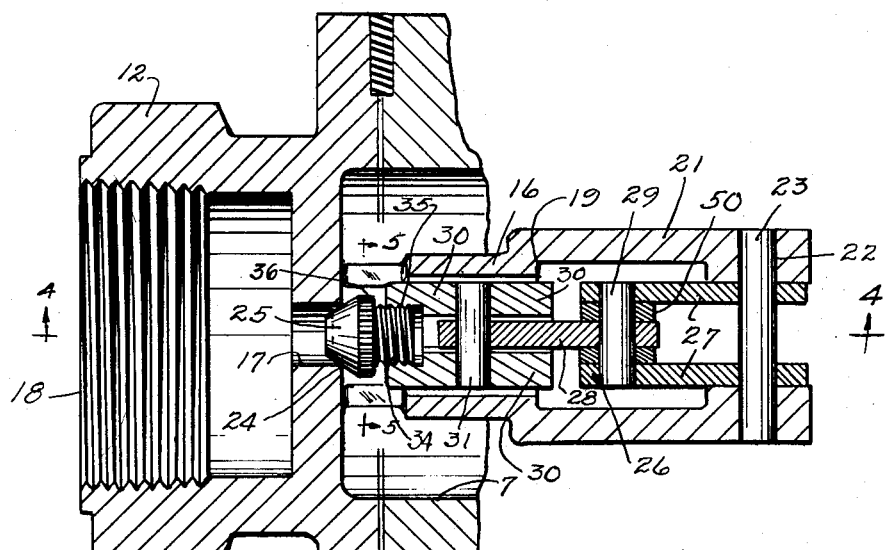
Figure 3 is a horizontal section of the toggle mechanism taken on an enlarged scale and in the plane indicated by the line 3—3 of Fig. 1.

In practicing my invention, I provide a gas-regulator casing 5 which includes a main chamber 6 having a horizontal outlet opening threaded to receive an outlet pipe, an inlet opening 7 about which is an annular flange 8. The bottom wall of the casing 5 is imperforate, while said casing has provision over said chamber for an upper integral sleeve 9 leading into a lower diaphragm section 10 having an annular flange 11. Facing the flange 8 I provide an inlet casting 12 having an annular flange 13 of size and form corresponding to flange 8, a suitable washer 14 of suitable material being provided between the flanges and securing bolts 15 serving to detachably mount the rigid casting 12 upon the main regulator casing 5. In my improved construction, the valve is carried by an inwardly extending frame member of such inlet casting 12.

On a common axis with said inlet casting, I provide an integral sleeve member 16 from which a valve orifice 17 of reduced size centrally of a transverse web of suitable size leads outward into the inlet opening 18 having internal threads for receiving the inlet main. The sleeve 16 projects in axial alinement with the inlet and outlet openings, through the inlet opening 7 far into the main chamber 6, retaining its cylindrical form to the plane transverse thereof at the point 19, but having a longitudinal slot 20 at its lower inner end for receiving an actuating link, as will later be explained.

Figure 4:
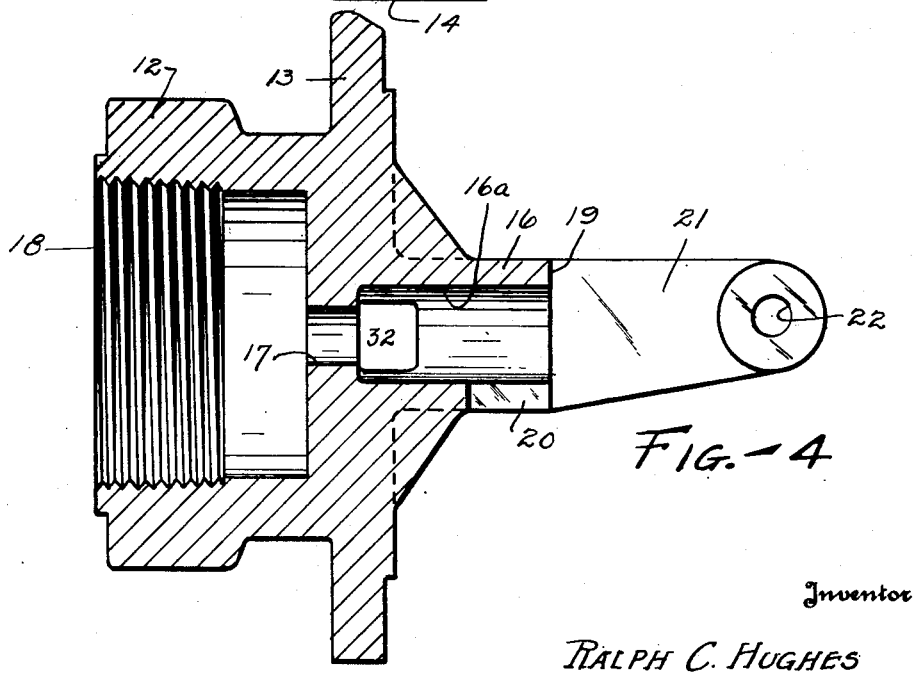
Figure 4 is a transverse section of the valve actuating mechanism as shown in the plane indicated by the line 4—4 of Fig. 3.

Integral with the extended sleeve 16 I provide a longitudinal frame extensibly mounted upon said casting and comprising parallel vertical horizontally-spaced plates 21 having an aperture 22 adjacent their ends remote from the sleeve for receiving therein a transverse pivot pin 23. It will thereby be seen that the pivot 23 is itself, carried upon the frame, and the latter upon the casting 12, as before explained. The inner end of the orifice 17 is designed to serve as a valve seat 24 against which a conical valve member 25 will be forced by actuating means including a toggle mechanism 26 comprising the links 27 pivoted upon the pin 23, and the link 28 pivoted to the former by the pivot 29. Said valve member 25 is carried in said frame extension of the casting by a hollow actuating plunger 30 wholly supported by the frame, and which is guided in its longitudinal movement, in the sleeve 16, whose inner cylindrical surface 16a is shown in Fig. 4.

The parallel plates 21 are adequately spaced to permit mounting between them the links 27 and 28 of the toggle 26 and somewhat loosely also, so that the required movement of the toggle members in operation will not be hindered, and the above described slot 20 at the inner end of the sleeve 16 on its lower edge is positioned in alinement with the link 28 to permit the latter to enter the slot or notch 20, when the common pivot 29 of the toggle 26 is lowered for the purpose of opening the valve 25. The inner ends of the plates 21 are rigidly fixed in position integral with the casting 12, the suitable means for mounting actuating parts of the toggle links being provided by cross pins as shown in Figs. 1 and 3. The outer end of the link 23 is pivoted on the pin 31 which is mounted in transverse apertures in the plunger member 30, the entire toggle mechanism being carried by the casting 12, but suspended through the opening 7 into the chamber 6. Lateral openings 32 are provided in the inner end of the sleeve.

Since the present improved regulator is especially designed for operation in connection with more than ordinarily high gas pressure, all details of this mechanism are made very strong to meet such condition, one of which involves a very positive and delicate adjustment of the valve member 25 for closing the orifice 17. For this purpose, the conical member 25 is provided with a cross groove 33 for actuation by tools at one end thereof facing in alignment with the orifice 17, and a threaded stud 34 at the other for adjustable insertion in a threaded socket 35 in the actuating plunger 30 which is guided in its longitudinal movement in said sleeve 16, in opening and closing the valve.

Since the adjustment of the said valve stud 34 in the plunger 30 obviously determines the angle of the toggle links effective in actuating the valve, as well as the mechanical advantage or power to be gained by the operating mechanism, I provide means of more than ordinary accuracy for maintaining the relative position of parts after adjustment has been made. For such purpose by the provision of a small wire lock member 37 carried by the member 30 parallel with the axis of the latter and extending outward over the periphery 36 of the member 25, I adjustably hold the latter yieldably against rotation.

The periphery 36 of the valve member 25 has a knurled surface for engagement by the outer end of the wire member 37 which normally sinks into the lower valleys of such surface, and the adjustable rotation of the conical member 25 relative to the socket 35 before mentioned, obviously serves to adjust the effective length of the combined member 25 and link 28, and thereby determine the effective angle between the links of the toggle. It is evident that as the valve seat 24 is gradually worn by service, it will be desirable to adjust the member 25 slightly outward to restore the effective length as stated, and the thrust of the valve member upon such seat.

It is clear that when my regulator structure is to be used in connection with a source of very high pressure supply, and the above described highly effective toggle mechanism to oppose such pressure, a more than ordinary strain will result upon the actuating parts operating between the pivotal mounting of the inner end of links 27 and the detachable valve seat which has heretofore been mounted detachably upon the main casing itself directly carrying the toggle. To overcome such very great strain between the parts, my improvement involves the use of both toggle links mounted on the identical detachable casting, which I have above explained is the inlet casing 12 carrying the entire toggle mechanism, save the common actuating transverse pin for both links. While the plates 21 are integral, and integral with the sleeve 16, which latter is also rigid and integral with the casting 12, as shown especially clear in Figs. 3 and 4 of the drawings, the term frame applies very appropriately to the combined sleeve 16 and plates 21. Within the sleeve 16 and its outer extension, the valve plunger 30 is movable lengthwise to operate the valve 25, the outer end of the link 28 being pivoted on the pin 31 carried by the plunger. The two pins 29 and 31 are therefore, movable within the frame while in operation, though the outer pin 23 is fixedly mounted in the frame. This is a true toggle exerting its power by bringing the links into alignment. This results therefore, in the great advantage that the rigid frame bodily mounts the toggle members within the outer outline of said frame. No part of the toggle extends at any time beyond such frame outline.

Because of the character of the means of mounting the toggle mechanism on the detachable casting 12 which must necessarily bear so great strain, I have found it necessary to employ exceedingly strong metal for the purpose, and have discovered that the use of phosphor bronze for the casting carrying the toggle is especially suitable, since it will withstand three and one-third times as much pressure as cast iron, the average ultimate strength of this casting being 18,750 pounds pressure per square inch.

Above the main regulator casing 5, and mounted upon the diaphragm section 10, I provide an upper section 38 having corresponding flanges 39 for fitting the flanges 11 of the lower section and clamping the flexible diaphragm 40 between the two flanges by detachable bolts 41. The section 38 has a relatively large threaded opening 42 in axial alinement with the central aperture 43 in said diaphragm, the opening being designed to receive detachably therein the threaded base 44 of a vertically elongated hollow dome member 45 normally positioned centrally of the section 38, and enclosing therein the coiled spring 46 for exerting a downwardly directed pressure upon said diaphragm 40, and thereby actuate the toggle in the casting 12 to open the valve.

For effectively directing the yielding pressure for actuating the toggle, I clamp said diaphragm between an upper plate 47 and a lower supporting plate 48 provided on its lower face with the pivoting fork 49 from which are suspended links 50 extending downward in a swinging relation from the pivot pin 51, through the sleeve 9 in spaced relation therefrom, and having their lower apertured ends mounted upon the common pivot 29 of the toggle links for actuating the latter. In making such actuating connection between the vertical links and the horizontal toggle links, the ends of the links 27 as well as the lower ends of links 50, are forked, and the end of the link 28 received between them, the five link ends having registered openings to receive the pin 29 therethrough to serve as a common pivot.

For actuating connection of the toggle with the diaphragm, the lower plate 48 has a square stud 52 which is threaded at 53 part way on the end, the stud passing through the diaphragm aperture and entering a corresponding square opening 54 in the upper plate 47, to thereby prevent the lower plate from turning on a vertical axis.

Above the upper plate 47, a nut 55 is tightened on the turned and threaded portion 53 of the stud 52, thereby clamping the two plates together and compressing the diaphragm 40. The upper plate 47 has a hexagon top for permitting the use of a wrench, and has its central opening enlarged around the square hole through which the square stud 52 of the lower plate passes, to protect the inner edge of the diaphragm against undue compression and to accommodate any surplus part of the diaphragm that may flow in under pressure of the two plates. This protection of the inner edge of the diaphragm in its natural state prevents the usual tendency of the latter to split.

The coil 46 will be retained in the member 45 between the nut 55 at its lower end which is seated in the throat 56 of the base sleeve 44 and the upper end which engages a socket plug 57 whose upper socket 58 is engaged by the lower end 59 of the threaded screw 60 which is adjusted in the axial opening 61 of the upper apertured and integral end 62, which latter is externally threaded to receive a protecting cap or hood 63 provided with a conventional ear lock device to avoid unauthorized tampering with the adjustment. A lock nut 64 is provided for the screw 60. An air vent 65 is provided in the upper section of the diaphragm casing to prevent undue trapping of air in the upper chamber thereof.

In the operation of my device the fluid pressure entering the inlet 18, and thence through the orifice 17, opposes the valve part 25 tending to open the latter and enter the main chamber 6 where the pressure is very appreciable as it is exerted upwardly against the lower surface of the diaphragm 40, the latter effect tending to straighten the links of the toggle and thereby close the valve in the casing 12. The opposing force of the coil 46 can be very accurately adjusted to properly oppose said closure.

By my improved structure for mounting the toggle mechanism upon frame parts wholly integral with the detachable inlet casting 12, the plates 21 being rigid their length, and not themselves actuated by the vertical links 50, but the latter connected directly with the toggle links at 29, to provide great strength in actuation against the more than usually heavy fluid pressure for which this mechanism is intended, the structure thereby, comprising the sleeve 16 and plates 21 projected far into the main chamber 6 of the regulator case 5, an exceedingly positive and accurate seating of the valve 25 in the orifice 17, is obtained, especially since the toggle and valve elements are mounted in the common unit 12 which may be attached to the main casing by securing the flanges 8 and 13 together detachably by the bolts 15, which attachment serves to accurately detachably mount the valve in proper position at the entrance of the opening 7, and at the same time positions the toggle mechanism beneath the coil 46 and supporting plate 48, though not directly connected to the main casing 5.

This unitary mounting of the valve actuating structure, results in power being applied to the links of the toggle in the casting 12, tending to separate the pivot pins 23 and 31 which are well positioned to resist such separation because of their being mounted upon the same casting, pin 23 in the plates 21 being stationary and pivot 31 carried by the plunger 30 within the frame member 16, yielding to straightening movement of the links, and thereby to close the valve. In placing my pressure regulator in commission, the screw 60 will be suitably adjusted to embody sufficient force in the coil 46 to thereby force the common pivot 29 downward and swing the links to a position permitting the passage of a normal supply of gas through the orifice 17 past the valve 25, and thence to the outlet opening which is seen at the right of the casing in Fig. 1 of the drawings, meanwhile, an upward pressure of the fluid being exerted in the chamber 6 tending to lift the diaphragm 40 and opposing the downward thrust of the coil.

Whenever the outlet pressure in the chamber 6 builds up for any reason therefore, the toggle links in the casting 12 will be straightened by the automatic raising of the diaphragm 40, and the valve will tend to close against the seat 24, until such higher pressure is relieved and the normal flow resumed. The control of the valve is fully adequate.

For adjustment of the valve member 25 for wear, a tool may be inserted into the chamber 18 for engaging the groove or eye 33 to rotate the member on its stud 34 to maintain a delicate fitting of the valve on its seat. If further repair of the valve mechanism should be required either of the pins 29 or 51 may be removed, and the entire casting 12 with its integral sleeve 16 together with toggle and valve mechanism may readily be removed, since it has no direct attachment with the body of the casing 5.

It will be obvious that changes may be made in the details of construction and also of the character of regulator to which this invention is applied without departing from the spirit of the invention as defined by the appended claims.

Having described my invention and set forth its merits, what I claim, and desire to secure by Letters Patent, is—

1. In a pressure regulating valve mechanism, the combination with a main regulator casing having an inner chamber, oppositely directed and alined inlet and outlet connections and an imperforate bottom wall, of an inlet casting detachably and axially connected with said inlet connection and having a transverse integral and centrally apertured web and an elongated and hollow fixed frame integral with said web and axially alined with said aperture, extending into said inner chamber, a hollow actuating member mounted in said frame for movement toward and from said aperture, a valve member detachably secured on the outer end of said actuating member in axial alinement with the central aperture of said web, the said inwardly extending frame comprising rigid but spaced parallel plates integral at their extreme inner ends and having a rigid transverse pin for receiving on its intermediate portion a pivotal member, toggle mechanism including spaced parallel links pivoted on said pin, and another link pivoted upon said actuating member at one end and with the inner ends of the parallel links at the other end, said toggle mechanism being thereby enclosed within said rigid frame, pressure responsive means mounted on said main casing and having actuating connection with said toggle links for straightening or bending them to close or open the valve.

2. In a pressure regulating valve mechanism, the combination with a main regulator casing having an inner chamber, inlet and outlet connections, and an upper outlet, of a detachable inlet casting having means for annular connection with the main casing about the said inlet connection and a transverse integral web having a central aperture for axial alinement with said inlet connection, the said central aperture providing a valve seat therein and said web having an integral inwardly directed guiding and supporting hollow frame coaxial with said inlet connection, and comprising a hollow cylinder and integral parallel plates whose inner ends support a fixed transverse pin, a hollow actuating plunger movably mounted in said hollow cylinder and carrying a valve member on its outer end directed in alinement with said web aperture, toggle links mounted within said frame and between the plates and pivoted together intermediate the ends of said combined cylinder and plates, the outer end of one link being pivotally connected with said hollow plunger, and the opposite end of the other link being pivoted upon said fixed pin, a pressure-responsive member mounted horizontally above said upper outlet normally opposing upward pressure, and having controlling connection with said intermediate connection of said links, the said links and plunger being carried wholly within the outline of the hollow frame.

3. In a pressure regulating valve mechanism, the combination with a main casing having an inner chamber, inlet and outlet connections and an upper diaphragm casing communicating with said chamber, of an inlet casting having detachable connection with the main casing at said inlet connection, a transversal centrally apertured partition integral with said casting and thereby providing a valve seat and an inwardly extending frame integral with said partition and comprising elongated, spaced and parallel plates and a guiding sleeve for insertion through said inlet connection and into said inner chamber, an elongated valve member movable in said sleeve toward and from said valve seat, the said frame being hollow, and the extreme inner end being suspended fixedly from said partition to provide rigidity required for supporting the valve actuating means within the said frame, the said actuating means including toggle links suspended between the plates and within the valve member, and pivoted together at a point intermediate the ends of said frame, the inner end of one link being pivoted on the inner end of the frame, and the opposite and outer end of the other link being pivoted upon the inner end of the valve member, a diaphragm in said upper casing having actuating links connecting the lower face of the diaphragm and the said intermediate ends of the said toggle links within said frame, for controlling said valve member in the casting frame, and yielding means in said upper casing for normally resisting the pressure upon the lower face of the diaphragm by fluid in the inner chamber.

4. In a pressure regulating valve mechanism, the combination with a main casing having an inner chamber, inlet and outlet openings, a diaphragm casing mounted on the upper end of said main casing and communicating with said chamber, of an inlet casting having detachable connection with the main casing at said inlet opening, and having an apertured partition providing a valve seat and an integral inwardly extending frame for insertion into said inner chamber and comprising a guiding sleeve and integral supporting parallel plates mounted on said sleeve at their base ends and having their extreme inner ends suspended in said inner chamber and fixedly so secured in position, an elongated valve member movable in said sleeve toward and from said valve seat, a diaphragm in said upper casing responsive to pressure in said inner chamber, toggle links pivoted together at their ends at a point intermediate the ends of said plates but between the latter, the respective opposite ends of the links being pivoted upon the inner ends of the plates, and upon said valve member, the links comprising the toggle mechanism being wholly enclosed within said frame including the plates and sleeve, an actuating link pivoted to the common pivot of said toggle links and connected with said diaphragm for straightening the toggle and closing the valve, and yielding means normally urging the diaphragm downward to oppose the pressure in the chamber and tending to open the valve.

5. In a pressure regulating valve mechanism, the combination with a main casing having an inner chamber, oppositely directed inlet and outlet connections, and an upper outlet, of an inlet casting having detachable annular connection with the main casing at said inlet connection, and an integral inwardly extending guiding and supporting frame forming a unitary and bodily removable valve mechanism with said inlet casting to control flow of fluid through the inlet connection into said main casing, said casting being fixedly supported with the extreme inner end thereof provided with a transverse pivot pin, toggle link mechanism for actuating said valve member mounted in said frame casting, and one link of the toggle being pivoted upon said casting pin, the other link being pivoted upon said valve member, while the two links are connected together pivotally intermediate the ends of the casting, means on said upper casing above said upper outlet connected with said valve mechanism for closing the valve in said guiding frame, and yielding means normally opposing said pressure responsive means to normally open the valve leading into said inner chamber.

RALPH C. HUGHES.